Figure 1:
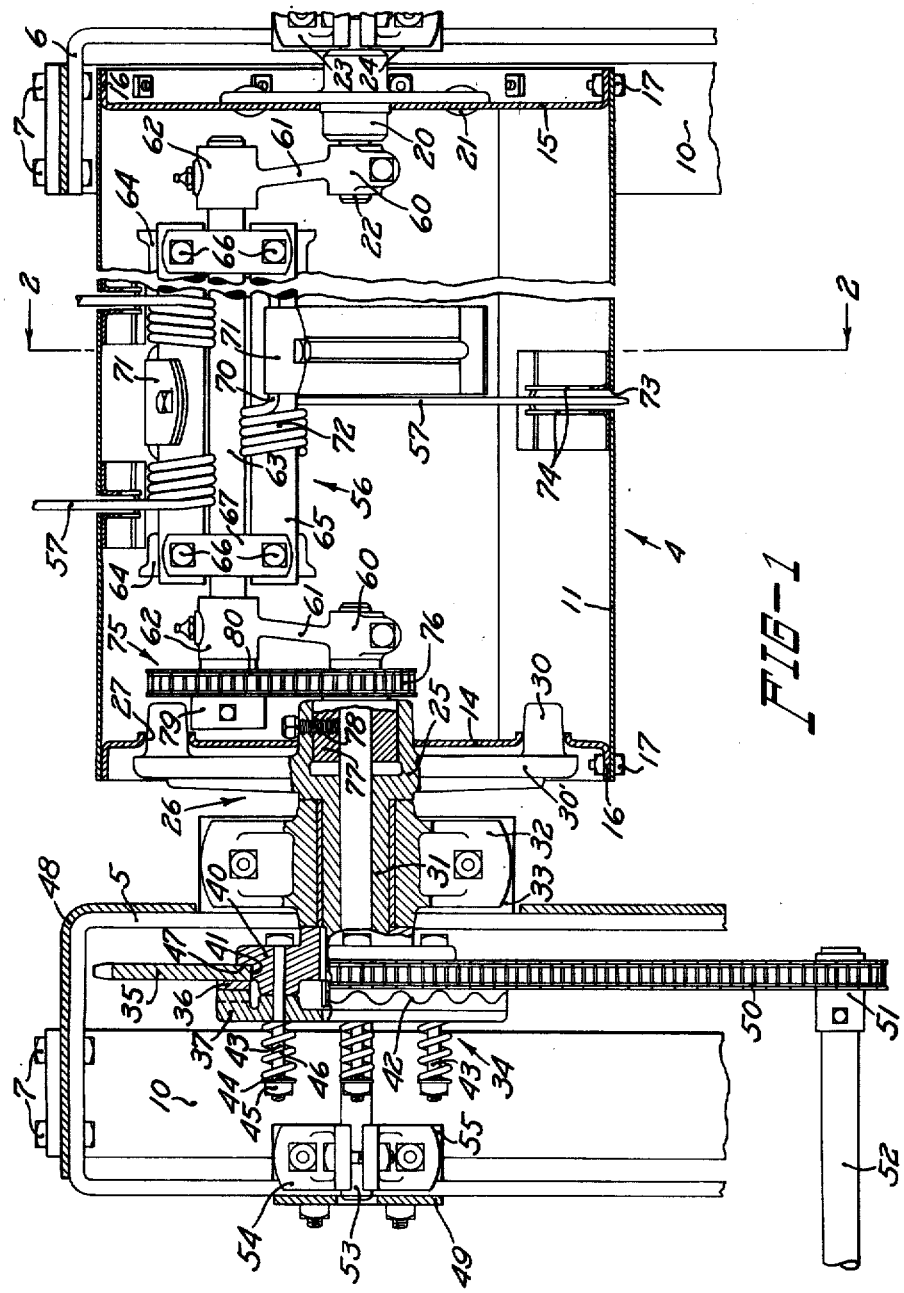

July 4, 1939.   R. L. ANDERSON   2,165,088
PICK-UP DEVICE
Filed Jan. 20, 1938   2 Sheets-Sheet 1

INVENTOR.
RALPH L. ANDERSON
BY
ATTORNEYS

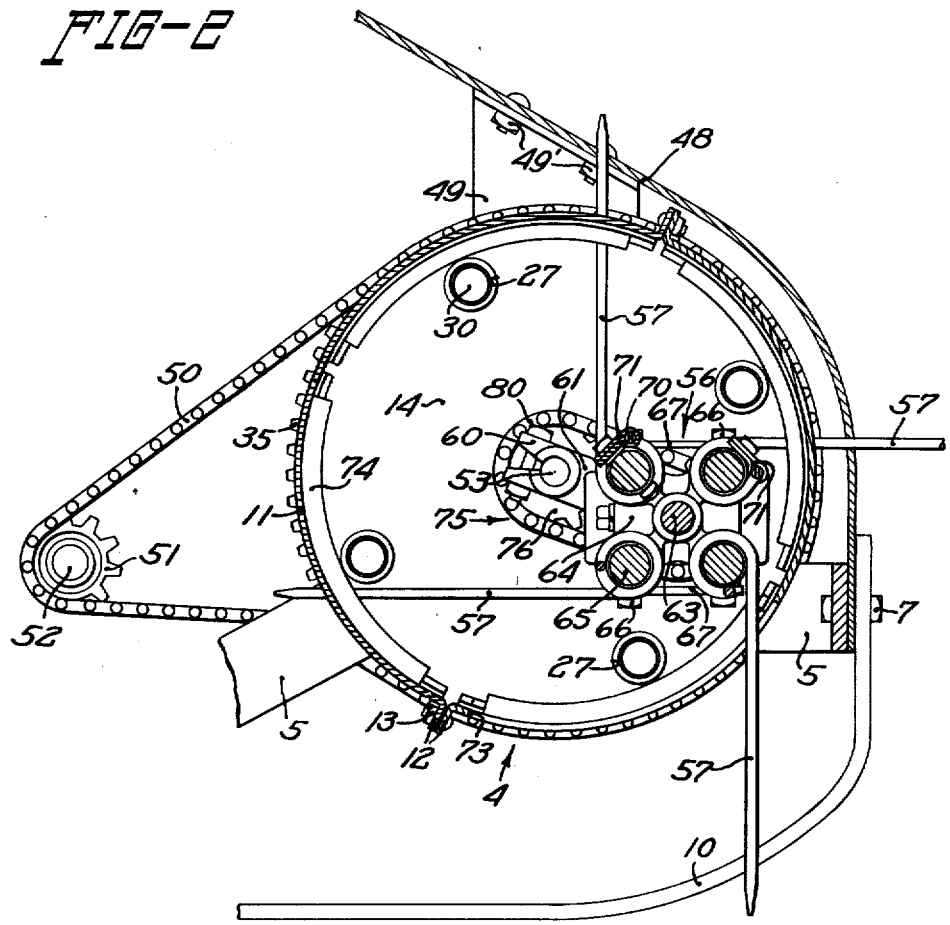

Patented July 4, 1939

2,165,088

UNITED STATES PATENT OFFICE 2,165,088

PICK-UP DEVICE

Ralph L. Anderson, Moline, Ill., assignor to Deere & Company, Moline, Ill., a corporation of Illinois Application January 20, 1938, Serial No. 185,918

19 Claims. (Cl. 56—364)

The present invention relates to rotary pick-up devices of the type commonly used on harvester-threshers after a crop has been cut by a windrower, and generally comprising a rotatable cylinder having raking tines which are extended and retracted as the cylinder rotates in a manner well known to those skilled in the art.

Heretofore, in machines of this type the raking tines have been swingably mounted on a shaft disposed within the drum parallel to and offset from the axis of rotation thereof, extending outwardly through apertures in the cylindrical surface of the drum. As the drum rotates the tines are rotated with it by contact of the edges of the apertures therewith. Under certain field conditions, as in rice fields, loose clods of mud are frequently encountered, which are picked up by the stiff tines provided on present pick-up devices, and are carried through the threshing mechanism which breaks the clods into small pieces which are collected with the threshed grain. Furthermore, with the conventional stiff tines, the pick-up device must be operated at such a height above the ground that the tines will not strike the ground and thereby stall the mechanism.

The principal object of my invention therefore, is the provision of a pick-up device having readily yieldable tines which will bend backwardly when encountering clods of mud and which will permit lower operation of the device whereby the teeth can comb the ground and so operate at greater efficiency. Since, with present construction, the tines are driven through contact with the drum and hence are not free to yield relative thereto, a more specific object of my invention relates to the provision of driving means for the shaft carrying the spring tines in order that the latter may be positioned within circumferentially extending slots in the drum intermediate the ends of the slots. In this way, the tines are not in contact with the drum and are free to yield under impact with an obstruction.

These and other objects and advantages of the present invention will become apparent after a consideration of the following detailed description of a preferred embodiment, reference being had to the appended drawings, in which Figure 1 is a plan view of a portion of a windrow pick up device embodying the principles of the present invention. The bearing support and slip clutch of the power drive end have been partially sectioned to show certain details of construction more clearly.

Figure 2 is a sectional end view taken along the line 2—2 of Figure 1.

Referring now to the drawings, the implement shown therein comprises a rotatable cylindrical drum, indicated in its entirety by the reference numeral 4, which is supported at one end in a U-shaped member 5 and at the other end in an L-shaped member 6, both of which members comprise a part of the implement frame. Adjustably secured to the front end of each of the members 5, 6 by bolts 7 is a downwardly and rearwardly curved runner 10 which gauges the working height of the cylinder 4 relative to the ground and also serves to support the weight of the pick up mechanism. The cylinder 4 is made up of two hemicylindrical sheet metal sections 11 having outwardly directed flanges 12 formed along the edges thereof, and the two sections are joined and fastened together along the flanges 12 by bolts 13. The ends of the cylinder 4 are closed by circular end plates 14 and 15 which are flanged at their outer edges as at 16 and secured to the sections 11 by bolts 17. The right end plate 15 is apertured at its center to receive a flanged bearing spool 20, and the latter is securely fixed to the plate 15 by means of rivets 21. A spindle 22 is passed through the bearing spool 20 and fixedly held at its outer end in a clamp 23 which is bolted to a bracket 24 fixed to the L-shaped member 6.

The left end plate 14 is likewise apertured at its center to receive the hub 25 of a driving member 26 and also at four symmetrically spaced points 27 near the outer edge of the plate 14 to receive four lugs 30 which drive the cylinder 4. The lugs 30 are supported on arms 30' which radiate from the hub 25 of the driving member 26 and are preferably formed integrally therewith. The driving member 26 also includes a sleeve 31 which is journaled on its outer surface in a bearing block 32. The latter is bolted to a bracket 33 which is fixed to the U-shaped member 5.

A slip clutch, indicated in its entirety by the reference numeral 34, is carried on the outer end of the driving member sleeve 31 and comprises a sprocket 35 to which is fixed the clutch driving member 36, a clutch driven member 37, and a supporting member 40. The latter is fixed to the sleeve 31 in any suitable manner, as by keys or the like, and is grooved on its periphery at 41 to form a bearing upon which the sprocket 35 is journaled. Both the driving member 36 and driven member 37 are provided with companionate serrations 42 which, when meshed, provide positive engagement between the two members.

The clutch members 36 and 37 are held in engagement by four long bolts 43 which extend through aligned perforations in the supporting member 40 and driven member 37 and which are provided with spring retaining washers 44 and lock nuts 45 on their outer ends. Compression springs 46 bear against the washers 44 and driven member 37, holding the latter under tension against the driving member 36 and attached sprocket 35. A shoulder 47 opposes the thrust of the sprocket 35 resulting from the force exerted by the springs 46. Under normal working conditions the tension of the springs 46 is sufficient to resist the force component tending to separate the driving and driven clutch members as a result of the cam action of the serrations 42. When overloaded, however, as when the cylinder 4 is prevented from rotating by some obstacle, the sprocket 35 rotates on the supporting member 40 and the serrations 42 of the driving clutch member 36 act against those of the driven clutch member 37 causing the latter to move in and out upon the shanks of the bolts 43 against the resistance of the springs 46 as the high points of the driving member 36 ride over the high points of the driven member 37.

A chain 50 operatively connects the sprocket 35 with a sprocket 51 which is fixed on a shaft 52, and the latter is connected to any suitable prime mover (not shown). The driving chain and sprockets, together with the clutch 34, are protected against dirt and detached vegetation which might tend to wind around the rotating parts, by a shield 48 which extends down over the front end and inner side of the clutch 34 and is fixed to the front of the U-shaped member 5 between the runner 10 and the transverse portion of the member 5, being held by the bolts 7. Additional bracing is provided by an arm 49 which is fixed to the outer side member of the bracket 5 and to which the shield 48 is bolted by bolts 49'.

A spindle 53, rigidly held at its outer end in a clamp 54 which is bolted to a bracket 55 fixed to the side of the U-shaped member 5 opposite that side supporting the bearing block 32, extends inwardly through the apertured sleeve 31 and hub 25 and projects a short distance into the interior of the cylinder 4. Disposed within the cylinder 4 and carried on the inner ends of the spindles 22 and 53 is the raking mechanism comprising a rotor, indicated generally by the reference numeral 56, which is driven synchronously with the cylinder 4 by means to be described shortly, and which carries the raking tines 57. Fixed to the ends of the spindles 22 and 53 by split-clamps 60 are downwardly and forwardly extending cranks or bracket members 61, each of which terminates in a bearing portion 62. A spindle 63 is journaled in the bearing portions 62 parallel to and offset from the axis of rotation of the cylinder 4. A pair of spiders 64 are fixed to the spindle 63 at opposite ends thereof and supported on the spiders parallel to the spindle 63, and in symmetrically spaced relation around the spindle are four rods 65. The rods 65 are non-rotatably connected to the spiders 64 by means of bolts 66 which pass through aligned apertures in adjacent pairs of rods and in the spider 64, as best shown in Figure 2. Additional bracing is secured by straps 67 which bridge the two pairs of rods 65, and through which the bolts 66 also pass.

The tines 57 are preferably made up in pairs, each pair comprising a single length of heavy gauge spring steel wire having a straight portion 70 intermediate its ends which is securely held by a clamp 71 bolted to the rod 65. From the clamp 71 the wire is wound around the rod 65 for a number of turns providing a coil spring 72, the purpose of which will be disclosed shortly. Finally, the ends of the wire extend tangentially outward to form the straight tines 57. All of the tines on one rod 65 lie in the same plane, while each plane of tines 57 is disposed perpendicular to its adjacent plane of tines. The tines on each rod 65 are spaced equidistant along the rod, and on each rod the tines are offset to one side of those on the preceding rod by one fourth of the distance between a pair of tines. Thus it will be seen that the resulting arrangement of tines is, in effect, a spiral. The cylinder 4 is provided with circumferentially disposed slotted apertures 73 which are so disposed that the tines 57 project through them intermediate the ends thereof. Fixed to the inner cylinder wall 11 on either side of each aperture 73 are shoulders 74 which provide a broad bearing surface less subject to abrasion resulting from the occasional rubbing of the tine 57 against the side of the slot, than would be the thin edge of the cylinder wall 11.

The rotor 56 is rotated synchronously with the cylinder 4 by means of a sprocket and chain drive, indicated generally by the reference numeral 75, comprising a driving sprocket 76, the hub 77 of which is journaled on the spindle 53 and is fixed to the hub 25 of the driving member 26 by means of a set screw 78. A driven sprocket 79 of the same diameter as the driving sprocket 76 and having the same number of teeth, is fixed to the end of the spindle 63 and the two sprocket wheels are operatively connected by a chain 80. Thus, with each revolution of the cylinder 4, the rotor 56 is rotated through an equal amount and in the same direction.

Due to the eccentricity of the rotor 56 relative to the axis of rotation of the cylinder 4, the tines 57 are extended and retracted through the apertures 73 in a cycle lasting through one revolution. In the embodiment shown and described herein, the direction of rotation of the cylinder 4 is counter clockwise as viewed in Figure 2 and one bank of tines is extended at its maximum length when the corresponding rod 65, spindle 63, and axis of rotation of the cylinder 4 all lie in the same plane. At the same time, the bank of tines on the opposite side of the rotor 56 are retracted within the cylinder 4 as far as possible while the other two banks of tines are extended in an intermediate position between the two extremes. It will be noted that the angularity of the tines 57 relative to the surface of the cylinder 4 varies widely throughout one complete revolution, as does also the position of the tine in the slot 73. The resulting sweeping and tossing motion of the tines greatly aids in clean picking up of all detached vegetation, while the retraction of the tines into the cylinder as the material is carried over the top, facilitates stripping of the material from the surface of the cylinder.

In the view shown in Figure 2, one of the banks of tines 57 extends vertically downward in the position at the moment of impact with the material being picked up, and it will be noted that the tine is disposed near the forward end of the slot 73. If the tine should strike a stone or other solid obstacle, the resiliency afforded by the coil spring 72 interposed between the relatively stiff tine 57 and clamp 71 is sufficient to permit the tine to drop back in the slot and assume a position more nearly tangent to the surface of the cylinder. In so doing, the tine is enabled to ride over the obstacle without damage either to itself or to any part of the mechanism.

What I claim as my invention is:

1. In a rotary pick up device of the class described, the combination of a rotatable drum having perforations through its cylindrical surface, means for rotating the drum, a rotor disposed within said drum the axis of rotation of which is parallel to and eccentric with that of the drum, means for rotating said rotor synchronously with said drum, said means including a revoluble member disposed within said drum concentric with the axis of rotation thereof and operatively connected with said rotor, and tines carried on said rotor and adapted to project through said perforations.

2. In a rotary pick up device of the class described, the combination of a rotatable drum having perforations through its cylindrical surface, means for rotating the drum, a pair of bracket members non-rotatably supported within said drum near opposite ends thereof, a rotor journaled in said bracket members offset from and parallel to the axis of rotation of said drum, means for rotating said rotor synchronously with said drum, said means including a revoluble member disposed within said drum concentric with the axis of rotation thereof and operatively connected with said rotor, and tines carried on said rotor and adapted to project through said perforations.

3. In a rotary pick up device of the class described, the combination of a rotatable drum having perforations through its cylindrical surface, means for rotating the drum, a pair of bracket members non-rotatably supported within said drum near opposite ends thereof, a rotor journaled in said bracket members offset from and parallel to the axis of rotation of said drum, means for rotating said rotor synchronously with said drum, said means including a wheel disposed within said drum concentric with the axis of rotation thereof and operatively connected with the drum to rotate therewith, a wheel connected with said rotor in radial alignment with said first mentioned wheel, flexible power transmitting means connecting said wheels, and tines carried on said rotor and adapted to project through said perforations.

4. A rotary pick up device comprising, in combination, a supporting frame having a pair of spaced bearings, a cylindrical drum rotatably supported at its ends in said bearings and having perforations through its peripheral surface, driving means for rotating said drum, a pair of crank arms non-rotatably supported within said drum near opposite ends thereof, a rotor disposed within said drum including a spindle journaled in the offset ends of said crank arms parallel to the axis of rotation of said drum, means for rotating said rotor in the same direction and at the same angular velocity as the drum, said means including a sprocket wheel operatively connected with said drum to rotate therewith, a sprocket wheel fixed on said spindle in radial alignment with said first mentioned sprocket wheel, and a chain operatively connecting said sprocket wheels, and tines carried on said rotor and adapted to project through said perforations.

5. In a rotary pick up device of the class described, the combination of a cylindrical drum rotatably supported at its ends and having circumferentially extending slots in its peripheral surface, means for rotating said drum, a rotor disposed within said drum, means supporting said rotor for rotation about an axis which is eccentric with that of the drum, transmission mechanism connecting said drum with said rotor for driving the latter in the same direction and at substantially the same angular velocity as the drum, and a plurality of tines flexibly connected to said rotor and projecting outwardly through said slots intermediate of the ends thereof, said tines being adapted to yield by moving along the length of the slots.

6. In a rotary pick up device of the class described, the combination of a cylindrical drum rotatably supported at its ends and having a plurality of axially and radially spaced circumferentially extending slots in its peripheral surface, means for rotating said drum, a rotor disposed within said drum, means for supporting said rotor for rotation about an axis eccentric with that of the drum, means operatively connecting said drum with said rotor for rotating the latter in the same direction and at substantially the same angular velocity as the drum, a plurality of tines corresponding in number and position to the aforesaid slots, and resilient means for connecting said tines with said rotor whereby the tines are yieldably held in position normally intermediate of the ends of the slots.

7. In a rotary pick up device of the class described, the combination of a cylindrical drum rotatably supported at its ends and having a plurality of axially and radially spaced circumferentially disposed slots through its peripheral surface, means for rotating said drum, a pair of bracket members non-rotatably supported within said drum near opposite ends thereof, a rotor journaled in said bracket members offset from and parallel to the axis of rotation of said drum, means for rotating said rotor synchronously with said drum, said last named means comprising a wheel disposed within said drum concentric with the axis of rotation thereof and operatively connected with the drum to rotate therewith, a wheel connected with said rotor, flexible power transmitting means operatively connecting said wheels, a plurality of tines extending through said slots, respectively, and spring means connecting said tines with said rotor whereby the tines are yieldably held in position intermediate the ends of the slots.

8. A rotary pick up device comprising, in combination, a supporting frame having a pair of spaced bearings, a cylindrical drum journaled in said bearings, a plurality of circumferentially disposed slots through the cylindrical surface of said drum, driving means for rotating said drum, a pair of crank arms non-rotatably supported within said drum near opposite ends thereof, a rotor disposed within said drum and journaled in the offset ends of said crank arms parallel to the axis of rotation of said drum, means for rotating said rotor in the same direction and at substantially the same angular velocity as the drum, said means including a sprocket wheel operatively connected with said drum to rotate therewith, a sprocket wheel fixedly connected with said rotor in radial alignment with said first mentioned sprocket wheel, a chain operatively connecting said sprocket wheels, a plurality of tines extending through said slots, respectively, and carried by said rotor, and spring means for connecting said tines with the rotor whereby the tines are yieldably held in position extending through said slots and normally spaced inwardly from the ends of the slots and intermediate the ends thereof.

9. A rotary pick up device comprising in combination, a cylindrical drum having a plurality of peripherally extending slots disposed therein, means for supporting said drum for rotation about its longitudinal axis, a rotor disposed within said drum, means for supporting said rotor for rotation about an axis substantially parallel to but offset from said drum axis, a plurality of tines mounted on said rotor and extending through said slots, respectively, means for rotating said drum, and means for rotating said rotor whereby said tines are maintained generally intermediate the ends of said slots.

10. A rotary pick up device comprising in combination, a cylindrical drum having a plurality of perforations disposed therein, means for supporting said drum for rotation about its longitudinal axis, a rotor disposed within said drum, means for supporting said rotor for rotation about an axis substantially parallel to but offset from said drum axis, a plurality of tines mounted on said rotor and extending through said perforations, respectively, means for rotating said drum, and mans independent of said tines for rotating said rotor at the same speed of rotation as that of said drum.

11. A rotary pick up device comprising in combination, a cylindrical drum having a plurality of peripherally extending slots disposed therein, means for supporting said drum for rotation about its longitudinal axis, a rotor disposed within said drum, means for supporting said rotor for rotation about an axis substantially parallel to but offset from said drum axis; a plurality of resilient tines mounted on said rotor and extending through said slots, respectively, said tines being adapted to engage severed vegetation for moving the latter but are adapted to yield when they encounter an obstruction by moving along said slot relative to said drum, and means for rotating said drum and said rotor at the same speed of rotation.

12. A rotary pick up device comprising in combination, a cylindrical drum having a plurality of perforations disposed therein, bearing means at opposite ends thereof for rotatably supporting said drum, a rotor disposed within said drum and carrying a plurality of tines extending outwardly through said perforations in the drum, a shaft extending coaxially through said bearing means but restrained against rotation with the drum, means for supporting said rotor on said shaft for rotation within said drum on an axis spaced from the axis of rotation of said drum, a wheel journaled on said shaft within said drum and connected to said drum for rotation therewith, a second wheel connected to said rotor for rotation therewith, and power transmitting means connecting said wheels.

13. In a rotary pick up device of the class described including a rotatable drum having apertures therein, a rotor spindle supported rotatably within said drum substantially parallel to the axis of rotation of the drum and offset therefrom, a plurality of tine supporting rods carried by said spindle and disposed substantially parallel thereto, and tines mounted on said rods and extending outwardly through said apertures.

14. In a rotary pick up device of the class described including a rotatable drum having apertures therein, a rotor spindle supported rotatably within said drum substantially parallel to the axis of rotation of the drum and offset therefrom, spiders fixed to said rotor spindle, a plurality of rods supported on said spiders substantially parallel to said spindle and spaced symmetrically around the latter, and a plurality of spring tines mounted on said rods and extending outwardly through said apertures.

15. A rotary pick up device of the class described including a rotatable drum having apertures therein, a rotor supported within said drum for rotation about an axis spaced from the axis of said drum, said rotor comprising a plurality of parallel rods, and tines mounted on said rods and extending through said apertures.

16. In a rotary pickup of the class described, the combination of a cylindrical drum having circumferentially extending slots in its peripheral surface, means for supporting said drum for rotation about its longitudinal axis, means for rotating said drum, a rotor disposed within said drum, means for supporting said rotor for rotation about an axis substantially parallel to but offset from said drum axis, means for rotating said rotor synchronously with said drum, and a plurality of tines mounted on said rotor and projecting outwardly through said slots and normally spaced inwardly of the ends thereof, said tines being adapted to yield by moving along the length of said slots.

17. A rotary pick up device comprising in combination, an elongated hollow drum having a plurality of peripherally extending slots disposed therein, means for supporting said drum for rotation about its longitudinal axis, a rotor disposed within said drum, means for supporting said rotor for rotation about an axis substantially parallel to but offset from said drum axis; a plurality of tines mounted on said rotor and extending through said slots, respectively, said tines being adapted to engage severed vegetation for moving the latter but are adapted to yield when they encounter an obstruction by moving along said slot relative to said drum, and means for rotating said device, said last named means being adapted to normally maintain said tines in the leading portions of said slots when the tines are in engagement with material on the ground, to provide for said yielding movement.

18. A rotary pick up device comprising in combination, a cylindrical drum having a plurality of perforations disposed therein, bearing means at opposite ends thereof for rotatably supporting said drum, a rotor disposed within said drum and carrying a plurality of tines extending outwardly through said perforations in the drum, a shaft extending coaxially through said bearing means but restrained against rotation with the drum, means for supporting said rotor on said shaft for rotation within said drum on an axis spaced from the axis of rotation of said drum, a rotatable sprocket supported within said drum and coaxial with said shaft, a second sprocket connected to said rotor for rotation therewith, an endless chain interconnecting said sprockets, and means for driving said sprockets to rotate said rotor.

19. A device of the class described comprising in combination, a hollow drum having a plurality of perforations therein, a rotor disposed within said drum and carrying a plurality of tines extending outwardly through said perforations in the drum, a pair of concentric shafts disposed one within the other and extending into one end of and coaxial to said drum, means supporting said drum on one of said shafts and providing for rotation of said drum about the axis of said concentric shafts, a supporting frame for said device, bearing means on said frame in which one of said shafts is journaled, means for nonrotatably supporting the other of said shafts on said frame, bearing means disposed within said drum on which said rotor is journaled, bracket means fixed to said nonrotatably mounted shaft for supporting said rotor bearing means in offset relation to said concentric shafts, a pair of wheels mounted on said rotatably mounted shaft and on said rotor, respectively, power transmitting means interconnecting said pair of wheels, and means for driving said last named shaft.

RALPH L. ANDERSON.

DISCLAIMER 2,165,088.—*Ralph L. Anderson*, Moline, Ill. PICK-UP DEVICE. Patent dated July 4, 1939. Disclaimer filed May 31, 1940, by the assignee, *Deere & Company*.

Hereby enters this disclaimer to claims 11, 13, 14, 15, 17, 18, and 19 of said Letters Patent.

[*Official Gazette June 25, 1940.*]

providing for rotation of said drum about the axis of said concentric shafts, a supporting frame for said device, bearing means on said frame in which one of said shafts is journaled, means for nonrotatably supporting the other of said shafts on said frame, bearing means disposed within said drum on which said rotor is journaled, bracket means fixed to said nonrotatably mounted shaft for supporting said rotor bearing means in offset relation to said concentric shafts, a pair of wheels mounted on said rotatably mounted shaft and on said rotor, respectively, power transmitting means interconnecting said pair of wheels, and means for driving said last named shaft.

RALPH L. ANDERSON.

DISCLAIMER 2,165,088.—*Ralph L. Anderson*, Moline, Ill. PICK-UP DEVICE. Patent dated July 4, 1939. Disclaimer filed May 31, 1940, by the assignee, *Deere & Company*.

Hereby enters this disclaimer to claims 11, 13, 14, 15, 17, 18, and 19 of said Letters Patent.

[*Official Gazette June 25, 1940.*]